Dec. 8, 1925.
S. G. CRANE
ADVERTISING SCALE
Filed Nov. 21, 1919
1,564,831
3 Sheets-Sheet 3
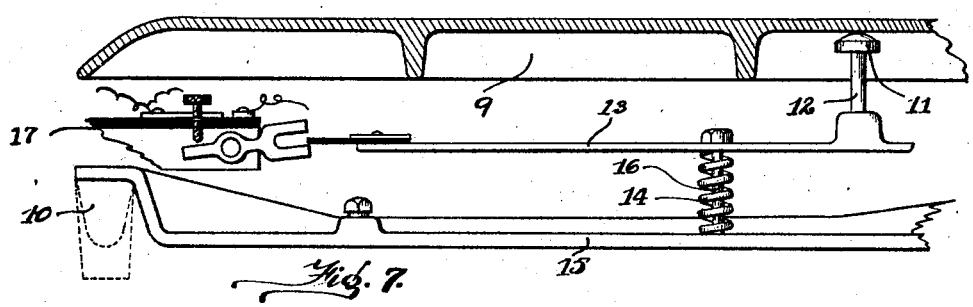
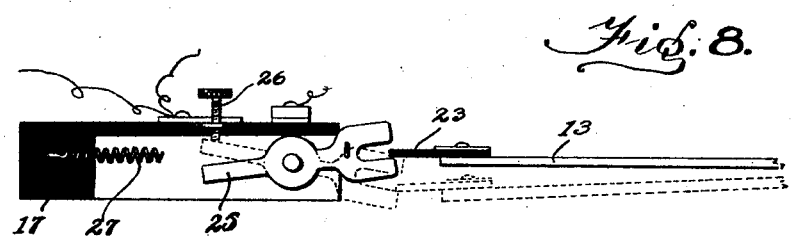
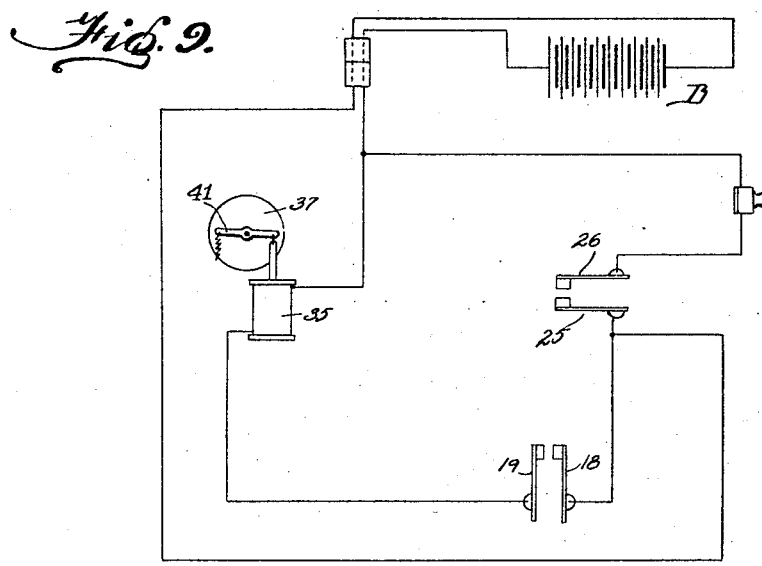
Witness
C. E. Wilcox
Inventor
Samuel G. Crane
By George R. Frye
Attorney Patented Dec. 8, 1925.

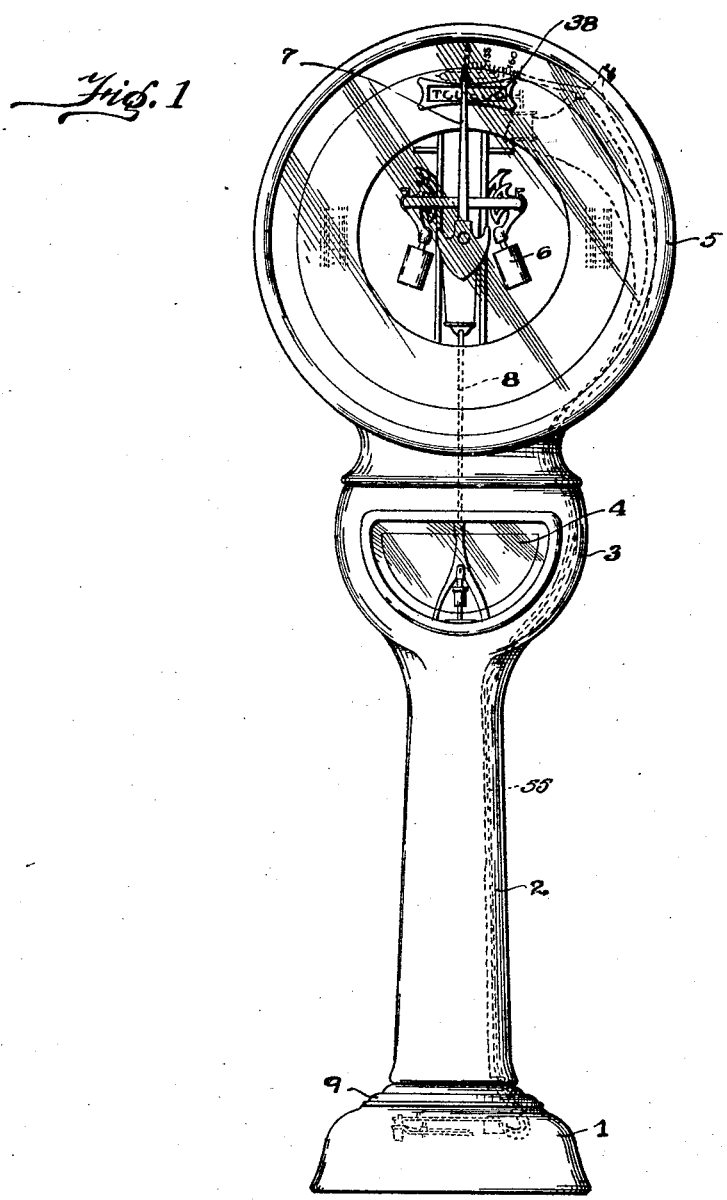

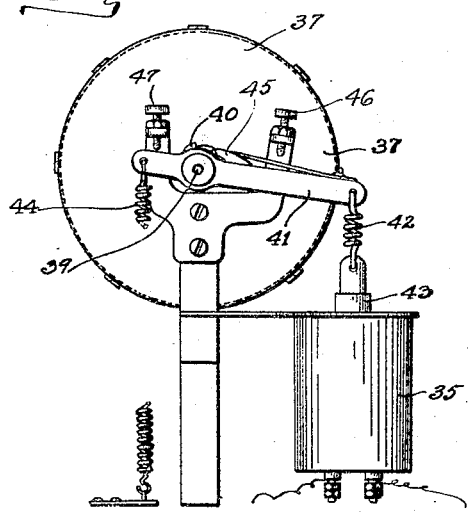
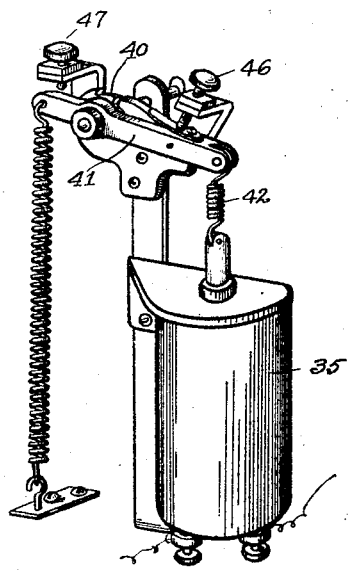
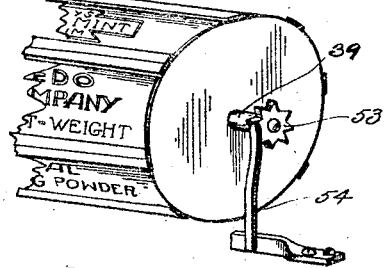
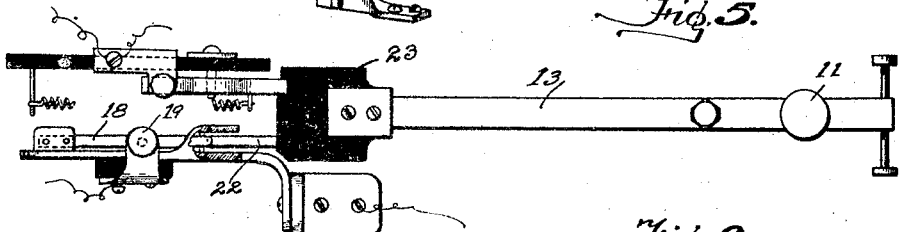
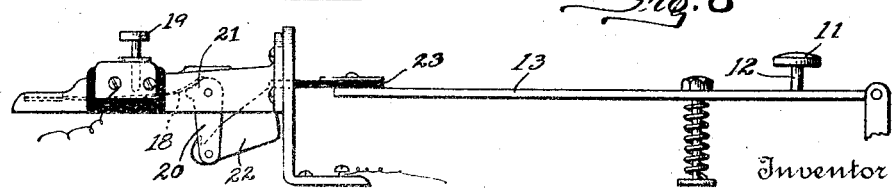

1,564,831

UNITED STATES PATENT OFFICE.

SAMUEL G. CRANE, OF TOLEDO, OHIO, ASSIGNOR TO TOLEDO SCALE COMPANY, OF TOLEDO, OHIO, A CORPORATION OF NEW JERSEY.

ADVERTISING SCALE.

Application filed November 21, 1919. Serial No. 339,683.

*To all whom it may concern:*

Be it known that I, SAMUEL G. CRANE, a citizen of the United States, residing at Toledo, in the county of Lucas and State of Ohio, have invented certain new and useful Improvements in Advertising Scales, of which the following is a specification.

This invention relates to advertising devices operated in connection with or as auxiliary to other mechanism, and I have illustrated as a preferred embodiment thereof a weighing scale, to use with which the advertising mechanism is particularly adapted. It is to be understood, however, that the advertising device forming a feature of this invention is also adapted for use with other machines, and that I contemplate the use of the advertising device wherever applicable.

One of the objects of this invention is to provide an advertising device operated as an auxiliary to a scale or other machine in which the character of the advertisement is changed with each operation of the machine.

Another object is to provide means for illuminating such an advertisement during the operation of the machine.

Another object is the provision of a changeable advertising device and an illuminating device therefor, and means for changing said advertising device at the beginning of a weighing operation of the scale and for continuing the illumination during the entire weighing operation.

Other objects and advantages will be apparent from the following description in which reference is had to the following drawings illustrating a preferred embodiment of my invention and in which similar reference numerals designate similar parts throughout the several views.

In the drawings:—

Figure 1 is a front elevation of the scale embodying my invention.

Figure 2 is an end elevation of an advertising reel and operating mechanism therefor, forming part of my invention.

Figure 3 is a perspective view of the operating mechanism for the advertising reel.

Figure 4 is a fragmentary perspective view of the reel and registering device cooperating therewith.

Figure 5 is a plan view of the switch mechanism controlling the advertising and illuminating devices.

Figure 6 is a front elevation thereof.

Figure 7 is a front elevation of a part of the switch mechanism showing the scale platform in section.

Figure 8 is a fragmentary detail of a part of the switch mechanism.

Figure 9 is a diagram of the electric circuits employed.

I have shown my invention as applied to a scale of the type known as a person weigher, to which, because of its advertising nature, it is particularly adapted. My invention, however, does not reside in the weighing mechanism per se, and so the scale will be described only with such particularity as will suffice to clearly show the connection of the other elements of my invention therewith.

As shown, the scale base 1 is of comparatively small area so that several persons cannot stand upon the scale at the same time. Secured to the base 1 and extending upwardly from the rearward end thereof is a hollow column 2. The upper end of this column is flared as at 3 and provided with front and rear windows 4.

Supported upon the flared upper end 3 of the column 2 is a substantially watch casing shaped housing 5 having a crystal in its forward side which displays the load-offsetting mechanism of the scale.

The load-offsetting mechanism shown is of substantially the automatic pendulum type described and claimed in the U. S. patent to Hapgood No. 1,203,611, dated November 7, 1916. It consists essentially of a pair of oppositely swinging pendulums 6 which swing outwardly and upwardly to offset the load on the scale. The pendulum mechanism is suitably connected to an indicator hand 7 which indicates the load offset upon a dial displayed through the crystal face of the housing 5. From the pendulum mechanism a connection 8 extends downwardly through the column 2 to the platform lever mechanism (not shown).

The platform 9 is carried by a spider 10 which is supported upon the platform lever mechanism. The platform 9 is not, however, immovably secured to the spider 10 as is usually the case in scales of this type, but it is slightly movable up and down relative thereto. When there is no weight on the scale one side of the platform is supported upon a round head 11 of a pin 12, which projects from the upper face of a lever 13 pivoted at one side of the platform spider 10. The lever 13 is held in the position shown in Figure 7 and in full lines in Figure 8 by means of a spring 14, which is supported upon a cross bar 15 of the platform spider 10. The spring 14 is held in place by means of a pin 16 secured to the lever 13 and passing through an opening in the cross bar 15 or vice versa.

When a person steps upon the platform 9 the pin 12 forces the lever 13 downwardly to the position shown in dotted lines in Figure 8, compressing the spring 14 until the platform engages the spider 10.

The switch mechanism which controls the advertising and illuminating devices is operated by a downward movement of the lever 13 and consists of two switches, both of which are open when the scale is not in use. One of these switches is momentarily closed and then opened when the scale is operated and the other remains closed during the entire period that the load remains upon the platform. The switch mechanism is mounted upon a bracket 17 of non-conducting material, which is secured to the platform spider.

The switch which is designed to be closed momentarily at the beginning of the operation of the scale comprises a resilient contact strip 18 and a contact screw 19. A pivoted member 20 having a cam 21 adapted to flex the resilient contact strip 18 into engagement with the contact screw 19 is carried by the non-conducting bracket 17. The member 20 carries a pawl 22 which is engaged by a non-conducting plate 23 on the lever 13 as the lever is forced downwardly by a load on the platform 9. The upper end of the cam-carrying member 20 is pivoted to the stationary non-conducting bracket 17, a pawl 22 being pivoted to its lower end. The pawl 22 is notched, as shown in dotted lines in Figure 6, and the notch is engaged by a shoulder on the member 20 so that the pawl cannot be swung downwardly beyond the position shown in Figure 6. As the lever 13 moves downwardly, the plate 23 contacts with the pawl 22, thus rocking the member 20 and the pawl outwardly as a unit and thereby closing the switch. As the downward movement of the lever continues, however, the plate 23 slips over the pawl 22 and the resilient strip 18 is permitted to spring away from the screw 19 thus opening the switch. On the upward movement of the lever 13 the pawl 22 merely rocks out of the path of the plate 23 and the switch is not affected.

The switch which remains closed during the weighing operation is shown most clearly in Figure 8. It consists of a pivoted member 25 and a contact screw 26. One end of the member 25 is bifurcated and straddles the plate 23. A retractile spring 27 passing above the pivoted axis of the member 25 normally holds it out of engagement with the screw 26. When the lever 13 moves downwardly the member 25 is rocked on its pivot until the spring 27 is carried across the pivotal axis of the lever when the lever snaps into engagement with the screw 26 and remains in contact therewith until the platform 9 again moves upwardly under the influence of the spring 14.

The resilient strip 18 and the contact screw 19 of the momentarily closed switch are connected to a solenoid 35 which is thus momentarily energized. The solenoid 35 furnishes the power which turns an advertising reel 37 so as to display a series of advertisements in turn. Since the advertising device is not mechanically connected to the weighing mechanism it may be placed at any desired point upon the scale or, if desired, located at any convenient distance therefrom. In an example shown the reel is journaled in supports located in the head casing and the advertisements are successively displayed at a window 38 of the dial of the scale.

The reel shaft 39 carries upon one of its ends a ratchet 40 which is rigid with the shaft and a member 41 which is free to rock thereon. One end of the rocking member 41 is connected by means of a coil spring 42 to the core 43 of the solenoid 35. A retractile spring 44 is connected to the other end of the rocking member 41 and normally holds the member 41 in such position that the core 43 is elevated. The rocking member 41 carries a spring pressed pawl 45 which co-operates with the ratchet 40, the ratchet and pawl being so turned that the pawl may ride over the ratchet without turning the reel when the core 43 is drawn into the solenoid. When the solenoid is de-energized and the member 41 is rocked by the spring 44, the pawl 45 engages the ratchet and partially rotates the reel 37. Movement of the rocking member in both directions is limited by means of adjusting screws 46 and 47. Fixed upon the end of the reel shaft 39, opposite the ratchet 40, is a star wheel 53 which is engaged by spring detent 54 and thereby serves to register the particular advertisement on display with the window 38.

The contact member 25 and contact screw 26, comprised in the switch which remains closed throughout the weighing operation of the scale, are electrically connected to a lamp 29 which is so placed as to illuminate the advertisement displayed at the window 38. The advertisement is, therefore, illuminated during the entire period that the scale is in operation.

The wiring may lie closely adjacent to the edges of the column 2 and housing 5 as indicated at 55 in Figure 1.

The parts being arranged as above described, and the device being connected to a proper source of current B the scale is ready for operation. When a person steps upon the platform the advertising reel is actuated, the illuminating circuit is closed and the advertisement on display is flooded with light.

While it will be apparent that the illustrated embodiment of my invention herein illustrated is well calculated to adequately fulfill the objects primarily stated, it is to be understood that the invention is susceptible to variation, modification and change within the spirit and scope of the subjoined claims.

Having described my invention, I claim:

1. In a device of the class described, in combination, weighing mechanism, a platform independently relatively movable with respect to said weighing mechanism, an advertising device, and electric means actuated by such movement of said platform to operate said device.

2. In a device of the class described, in combination, weighing mechanism, a platform independently movable relatively thereto, an advertising device, a circuit for operating said advertising device and a switch in said circuit arranged to be closed by such movement of said platform.

3. In a device of the class described, in combination, weighing mechanism, a platform independently movable relatively thereto, an advertising device, a circuit for operating said advertising device, a switch in said circuit, and means for momentarily closing and then opening said switch upon movement of said platform.

4. In a device of the class described, in combination, weighing mechanism, a platform independently movable relatively thereto, an advertising device, a circuit for operating said advertising device, a lever connected to said platform to be moved thereby, and a switch in said circuit arranged to be momentarily closed and then opened by movement of said lever.

SAMUEL G. CRANE.